United States Patent [19]
Lockwood

[11] Patent Number: 5,251,186
[45] Date of Patent: Oct. 5, 1993

[54] PREPROCESSOR AND ADAPTIVE BEAMFORMER FOR LINEAR-FREQUENCY MODULATION ACTIVE SIGNALS

[75] Inventor: James C. Lockwood, San Diego, Calif.

[73] Assignee: The United States of America as represented by the Secretary of the Navy, Washington, D.C.

[21] Appl. No.: 957,544

[22] Filed: Oct. 6, 1992

[51] Int. Cl.$^5$ .................................... G01S 15/00
[52] U.S. Cl. ................................ 367/103; 367/100; 367/105
[58] Field of Search .............. 367/105, 103, 102, 101, 367/100; 342/128, 129, 130, 131, 132

[56] References Cited

U.S. PATENT DOCUMENTS

| | | | |
|---|---|---|---|
| 3,569,967 | 3/1971 | Gendreu | 342/132 |
| 4,123,719 | 10/1978 | Hopwood et al. | 328/155 |
| 4,287,578 | 9/1981 | Heyser | 367/88 |
| 4,404,562 | 9/1988 | Kretschmer, Jr. et al. | 342/132 |
| 4,559,605 | 12/1985 | Norsworthy | 364/726 |
| 4,662,223 | 5/1987 | Riley et al. | 73/626 |
| 4,754,282 | 6/1988 | Edelblute et al. | 342/417 |
| 5,059,966 | 10/1991 | Fujisaka et al. | 342/25 |
| 5,061,933 | 10/1991 | Macomber et al. | 342/128 |

OTHER PUBLICATIONS

"The Use of Fast Fourier Transform for the Estimation of Power Spectra: A Method Based on Time Averaging Over Short, Modified Periodograms" by Peter D. Welch, pp. 70-73.

"Adaptive Beamforming for Coherent Signals and Interference" by Tie-Jun Shan and Thomas Kailath, Fellow, IEEE, pp. 527-536.

Primary Examiner—Daniel T. Pihulic
Attorney, Agent, or Firm—Harvey Fendelman; Thomas Glenn Keough

[57] ABSTRACT

A device is provided for processing an echo received by an array of N receiving elements from a target at range R ensonified by an LFM signal of bandwidth B transmitted for a duration T. The device receives each elements output $f_n(t)$ over the elements total receiving time and selects time window element outputs $f'_n(t)$, which are discrete portions of $f_n(t)$, each time window extending from an arbitrary initial time $T_0$ to time $T_f$ and is spaced from $T_0$ no more than T and, if there is a target within the window, an echo is received at time $T_n$. Further the device produces element frequency difference outputs $g_n(t)$ from the frequency difference between a replica of at least a portion of the transmitted LFM signal and the time window element outputs $f'_n(t)$, the outputs $g_n(t)$ being tones with frequencies directly proportional to the time $T_n$ of the target from the time $T_0$ so that the target range $R=(c/2)(T_0+T_n)+\Delta R_n$, where c is the speed of sound, and $\Delta R_n$ is the distance by which R exceeds each element's range to the target. With this arrangement range and bearing of the target from the array can be more easily ascertained by dealing with parameters of cw, rather than broadband signals. This arrangement facilitates the application of adaptive beamforming techniques in a manner similar to their application to narrowband signals.

8 Claims, 5 Drawing Sheets

PREPROCESSOR AND ADAPTIVE BEAMFORMER FOR LINEAR-FREQUENCY MODULATION ACTIVE SIGNALS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Linear-frequency-modulation (LFM) signals have been used for a long time as search waveforms for sonar systems. One application of LFM is the continuous transmission frequency modulation (CTFM) sonar which has been used for fish finding and obstacle avoidance. In the CTFM sonar, a very long LFM sweep is transmitted continuously. The angular sweep of a receiving hydrophone gives the echo from the target a pulse length equal to the time it takes the beamwidth of the receiving hydrophone to sweep past the target. The echo is mixed with the transmitted sweep and the difference frequency, which is constant, is detected. This difference frequency, which is a demodulated target echo, determines the range to the target.

LFM and other forms of FM pulses have also been used in active sonar applications. Active sonars have been developed that use weighted sums of discrete element outputs from receiving arrays for detecting targets. Adaptive beamforming has been applied to active signals, though it is more commonly used in passive receiving applications to weight the receiving elements to provide an improved coherent beam output. The prior art applications of adaptive beamforming to active sonar have a problem when they use the frequency domain approach for their adaptive beamforming. The problem is that they have to deal with a block size of data that is at least twice as long as the time required for a signal to fill (completely envelope) the entire array of receiving elements. This time may be very long compared to the inherent time resolution of the waveform which is the reciprocal of bandwidth (1/B). When the adaptive beamforming is done, weights are derived that seek to null out sources of interference that arrive at the same time as a given range resolution cell. However, instead of dealing with sources of interference that are active very close to a time resolution cell (1/B in length) under consideration, they deal with sources of interference which may be miles away. This is because they are processing data over a block of time which is long enough to make sure that the array has been filled. Consequently, the prior art is controlled by the size of the array relative to 1/B. The longer the array, the larger the block of data they have to deal with and hence the further they are driven away from dealing with local parameters at any range from the array. A further issue has to do with waveforms that have a large time-bandwidth product and must be subjected to some kind of pulse compression, such as correlation processing, to achieve the 1/B time resolution. Prior to pulse compression, any sample of the received signal contains echoes form the entire pulse length, which is much longer than 1/B. Hence, the prior art is also restricted in it's ability to deal with local parameters by the pulse compression requirement.

SUMMARY OF THE INVENTION

In the present invention the parameters used for adaptive beamforming are not controlled by the size of the array or the need for pulse compression. In a line array, for instance, the invention utilizes parameters which are very localized to the range under consideration regardless of the length of the array, and pulse compression is accomplished prior to beamforming. This is accomplished by a device for processing receiving element outputs after receiving echoes from a transmitted LFM signal. For each transmission the elements have a block of time, determined by the maximum range to be processed, over which they receive echoes. The invention selects smaller blocks of time (time windows) which have different beginning times and cover the entire block of time over which echoes are to be received. Each time window has a time length which is equal to or less than the time length (T) of the transmitted pulse and a range length which is equal to one half the time length of the window times the speed of sound in water (c).

For each time window the echo received is mixed with a replica of the transmitted signal which is positioned in time at the beginning of the time window. This mixing accomplishes three things: (1) time difference is mapped into frequency difference, (2) the pulse is compressed such that the time resolution, 1/B, is realized as a frequency resolution, 1/T, and (3) a point target produces a cw pulse, the frequency, amplitude and phase of which may be extracted to determine the precise range and strength of the target. The difference frequency is very important because it represents the delay of the target from the beginning time of the window. With that information, range from the array can be determined by adding the range due to frequency difference to the beginning range of the particular time window. Also of importance is that the invention now is dealing with amplitude and phase parameters which are local to a particular range and which can be averaged to give better parameter estimates to be used in the adaptive beamforming process than the prior art allows. The length of the time window, which is equal to or less than the length of the transmitted pulse, can be divided into time resolution cells, each time resolution cell having a time width equal to the reciprocal of bandwidth. Each time resolution cell corresponds to a frequency resolution cell of frequency width equal to the reciprocal of the pulse length. These frequency resolution cells are range defining since there is a one to one correspondence between frequency and time cells and time and range are related by $R=ct/2$ where c equals the speed of sound. With the present invention a covariance estimate used in the adaptive beamforming process can now deal with local parameters instead of parameters containing interference from far away sources.

The invention has been summarized as if there was a target within the time window. In practice, all time windows would be processed to search for targets out to the maximum range of the system. This is simply done by sequentially extending and retracting the time windows by changing the beginning times thereof. In practice this is accomplished by listening for a target over sequential blocks of time out of the total listening period.

OBJECTS OF THE INVENTION

An object of the present invention is to overcome the aforementioned deficiencies of prior art active sonar systems.

Another object is to provide a device and method which will produce more precise localization parameters when processing broadband active signals.

A further object is to provide a device and method which are able to work with blocks of active signal data which are not dependent upon the size of the receiving element array.

Still another object is to provide a device and method for producing data parameters from broadband active sonar signals which can be processed on a more localized basis in an adaptive beamformer.

Still a further object is to provide a device and method for processing data parameters from broadband active sonar signals which are highly localized to a potential target.

Yet another object is to generate adaptive beamforming weights which are based on local data parameters which are highly localized to time resolution cells within discrete time windows spaced at varying times from a listening array.

Yet a further object is to provide a device and method which enables a covariance estimate based on broadband active sonar data in the immediate vicinity of a particular range resolution cell.

These and other objects of the invention will become more readily apparent from the ensuing specification when taken together with the drawings.

DESCRIPTION OF THE PREFERRED EMBODIMENTS AND METHOD

Figure 1:
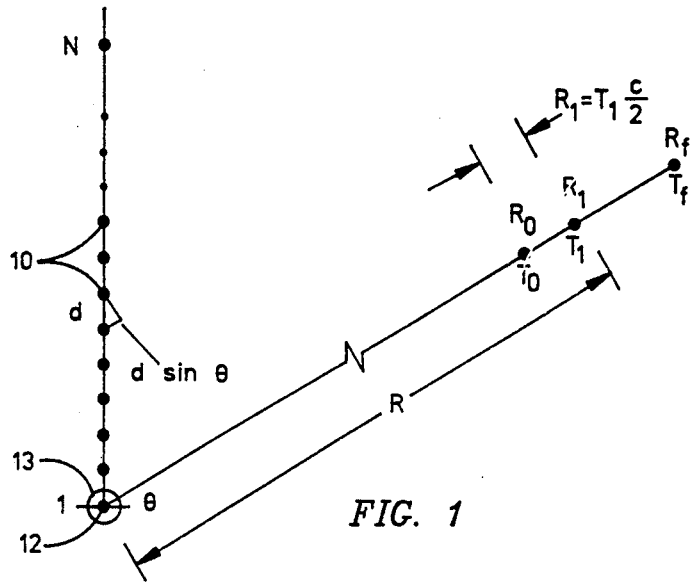
FIG. 1 is a schematic drawing of a line array of receiving elements (hydrophones) with a time window commencing at $R_0$ and a target within the time window at R.

Referring now to FIG. 1 there is shown a line array of listening elements (hydrophones) 10 which may be equally spaced from one another by a distance d. The distance d may be equal to one half a wavelength at the top of the band of a linear frequency modulation (LFM) pulse or any other suitable spacing. It should be understood that the invention is usable for radar or sonar listening elements and that the elements can be equally or unequally spaced in a planar array, a line array or a volumetric array. For the line array shown in FIG. 1 there are N elements with the first element being shown at 12. The line array may be mounted or deployed by any means and the LFM pulse can be transmitted from any position compatible with the reception of signals at the array or, for purposes of explaining the invention, by a transmitter 13 located at the position of the first element 12.

The transmission of an LFM pulse for a duration of time T is essential for the operation of the present invention. The unique property of an LFM pulse is that when an echo is mixed with a replica of the transmitted pulse, a difference frequency is produced which is representative of the range of the target from the point of transmission. The formula for the LFM pulse is:

$$f(t) = 2\sin \omega_0(1 + at)t \text{ where} \tag{1}$$

$\omega_0$ = frequency in radians per second at the beginning of the sweep;

$a$ = half the rate of change of frequency with respect to time; and $t$ = time.

The instantaneous frequency during the sweep is $2\omega_0 at$. A replica of the LFM pulse is shown by the dashed line in FIG. 3.

Figure 2:
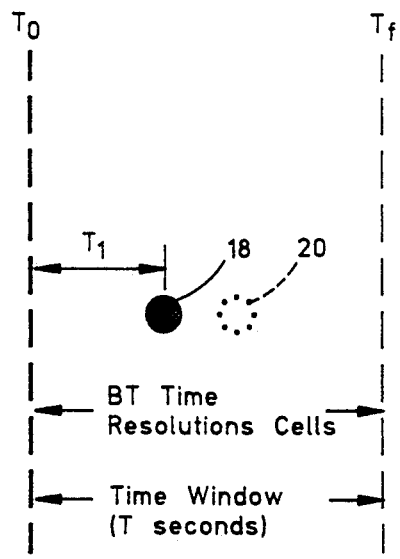
FIG. 2 is a schematic illustration of a time window with a target at time $T_1$ from the commencing time $T_0$ of the time window.
Figure 3:
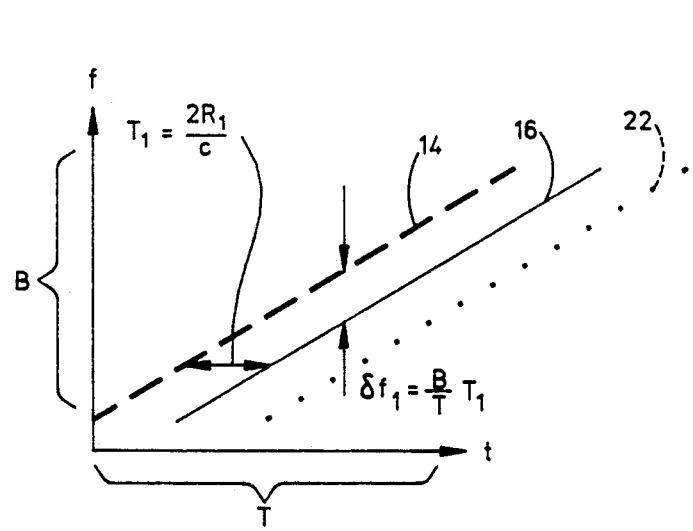
FIG. 3 is a graph of bandwidth versus time comparing the echo from the target with a replica of a transmitted LFM pulse which ensonified the target.

Also important to the invention is the concept of a time window which is shown in FIGS. 1-3. In FIG. 1 a potential target is considered at range R from the first element 12 so that a plane wave echo of a distant target hits all of the elements at an angle $\theta$, the angle $\theta$ being equal to zero if the target were broadside to the line array. The target at range R is shown within a time window which may contain echoes from range $R_0$ to range $R_f$, where $R_0$ is considered a commencement range from the first element 12 at time $t=0$. As shown in FIG. 2 the time window is on the order of T seconds in time length where T is the length of time of the transmitted LFM pulse. The length of the time window should be equal to or less than T.

Another important feature of the invention is that the time window is a discrete length of time T out of the total listening time of the array. It starts at time $T_0$ (time $t=0$) which corresponds to range $R_0$ and ends at time $T_f$ which corresponds to range $R_f$. As will be explained hereinafter the time window will be separately set aside for processing by taking a portion of the entire listening time of the elements, which portion corresponds to a respective time window. This is accomplished by (1) starting the time window after the time that it takes for the LFM pulse to travel out and return from range $R_0$ and (2) ending the time window at the expiration of the time that it takes for the pulse to go out and return from range $R_f$.

If the time window, shown in FIG. 2, is T seconds in length, the range width of the window is one half T times the speed of sound (c). The time duration of a time resolution cell is the reciprocal of the bandwidth (1/B) of the LFM pulse. Accordingly, if the bandwidth B in FIG. 3 is 100 HZ then the time resolution cell is 1/100th of a second long. If T, for instance, equals one second there would then be 100 time resolution cells in the time window of FIG. 2. A range resolution cell $$\left( \frac{c}{2B} \text{ in range width} \right)$$

corresponds to a time resolution cell (1/B in time width) which corresponds to a frequency resolution cell $\omega_k$ (1/T in frequency width).

In detecting an unknown target the time window would be sequenced out and back so that hopefully somewhere along the line a target would be encompassed by one of the time windows. The time windows are sequenced simply by changing the distance of range $R_0$ from the first element. It may be desirable to sequence the steps a little less than the width T of the time window so that all targets are received for a large fraction of the entire pulse duration. When a target echo is received within a time window the response will be similar to the solid line 16 in FIG. 3 corresponding to the solid target 18 in FIG. 2. If another target 20 were present it might have a response similar to the dotted line 22 in FIG. 3. If the time spacing between the targets is at least the reciprocal of bandwidth both targets should be detectable.

Another important feature of the invention is shown in FIG. 3. If the target signal at 16 is compared with a replica 14 of the transmitted LFM signal commencing at time $T_0$, which is time zero, then the frequency difference between the target signal and the replica is constant and is directly related to the distance $R_1$ of the target from the range $R_0$ in FIGS. 1 and 2. As can be seen from FIG. 3 the time difference between the two signals is $$T_1 = 2\frac{R_1}{c} \quad (2)$$

and the frequency difference between the two signals is $$\delta f_1 = \frac{B}{T} T_1. \quad (3)$$

It can be seen that range or time will map into frequency or vice versa. By dealing with a discrete time window and only frequency phase and amplitude differences between an echo and a replica of the LFM signal, the data parameters are especially well conditioned for the signal processing which will be described hereinafter. This data conditioning is especially important when the data are to be weighted by an adaptive beamformer. When a covariance estimate is made in the adaptive beamformer the processing is localized to only a few time cells at a time so that all the interference beyond the corresponding range extent is not involved in the processing.

Referring to FIG. 1, if $t=0$ for the arrival time of a hypothetical echo from range $R_0$ at the first element 12, then the arrival time of an echo from range R of a potential target is $$T_1 = 2(R - R_0)/c, \text{ where} \quad (4)$$

c = speed of sound in water.
The arrival time of the echo from $(R, \theta)$ at the nth element is $$T_n = T_1 - (n-1)d/c \sin\theta \text{ where} \quad (5)$$

n = the nth element,
d = the spacing between the elements, and
$\theta$ = the angle at which the plane wave of the echo hits the elements.

The LFM echo arriving at the nth element would then be $$f_n(t) = \sin \omega_0[1 + a(t - T_n)](t - T_n). \quad (6)$$

$f_n(t)$ is then the output of each element which is to be processed by the present invention.

Figure 4A:
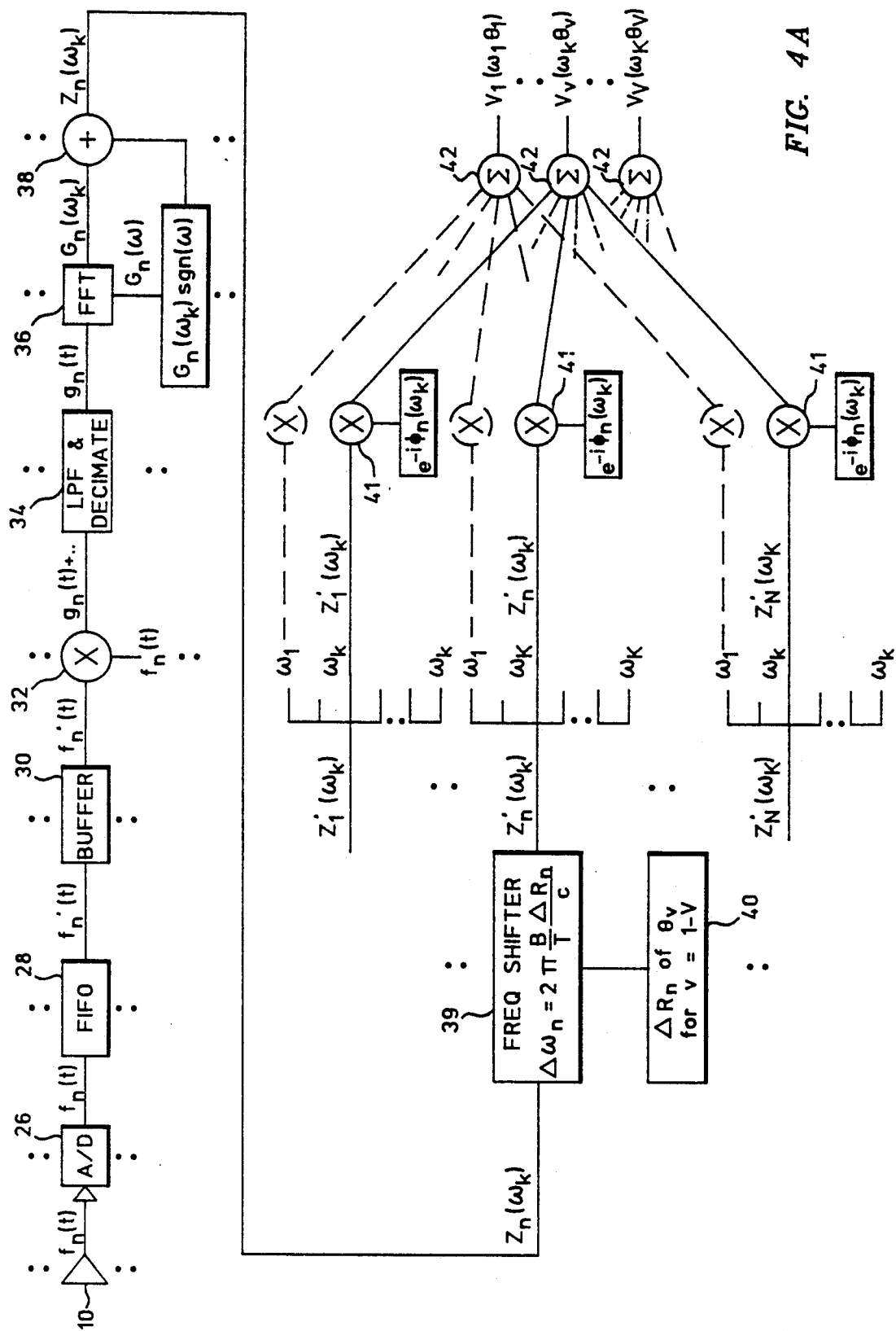
FIG. 4(A&B) is a block diagram of a preferred embodiment of the present invention.
Figure 4B:
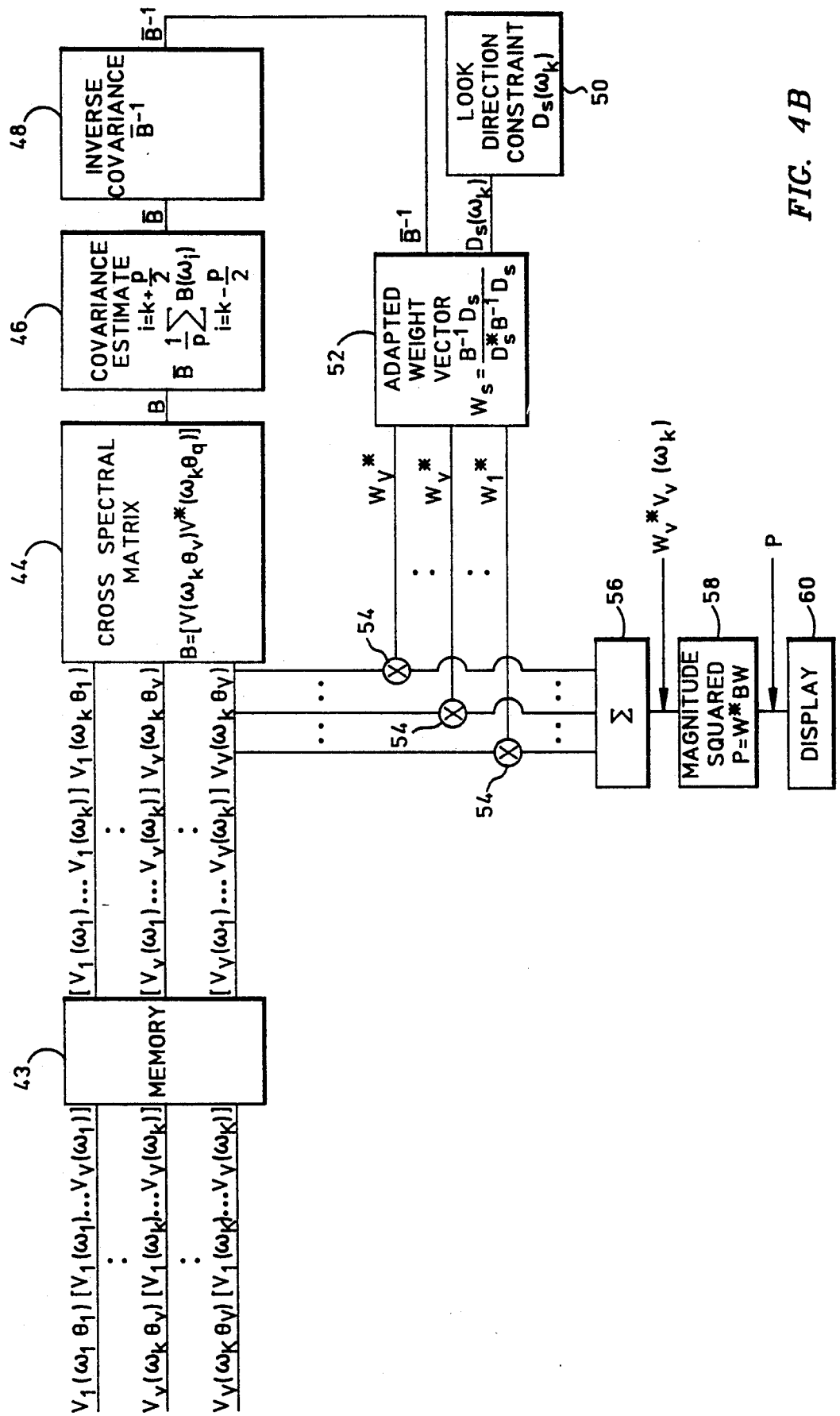

As shown in FIG. 4 an A/D converter 26 may receive an output $f_n(t)$ of a respective receiving element 10 of the array. The A/D converter will sample at a relatively high frequency (Nyquist rate or higher) so that it will contain the desired information. A FIFO (first in first out) 28 receives a stream of data from the A/D converter, which stream of data represents a receiving element output $f_n(t)$. The FIFO sequentially outputs blocks of data which represent a series of time windows, each time window having a commencement time $T_0$ and an ending time $T_f$. In essence each time window represents a partial receiving element output $f'_n(t)$. buffer 30 receives the partial outputs $f'_n(t)$ from the FIFO 28 and releases them at a proper time for further processing. The partial element output $f'_n(t)$ is a small portion (time window) Of the total listening time output $f_n(t)$. This time window has a time width which is preferably equal to or less than the time length T of the transmitted LFM pulse. The time windows would be ranged out and back to pick up any possible targets. An example of time windowing is illustrated in an article entitled "The use of Fast Fourier Transform for the Estimation of Power Spectra: A Method Based on Time Averaging Over Short, Modified Periodograms", *IEEE Transactions on Audio Electroacoustics*, Vol AU-15, No. 2, pages 70–73 by Peter D. Welch. This article is incorporated herein by reference thereto.

Each of the partial element outputs $f'_n(t)$ (time window) is mixed with a digital replica of the transmitted LFM pulse by a mixer 32, the replica being shown at 14 in FIG. 3. The beginning of the LFM pulse is located in time at the beginning of the time window (t=0). This mixing then changes each element's output to $g_n(t)$ where $$g_n(t) = \cos \omega_0[2aT_n t + T_n(1 - aT_n)] \quad (7)$$

$$- \cos \omega_0\{2[1 + a(t - T_n)t] - (1 - aT_n)T_n\}$$

The first part of this equation provides frequency and phase information, the frequency being the difference between the echo 16 and the LFM replica 14 shown in FIG. 3.

In order to eliminate the sum frequency terms, $g_n(t)$ is passed through a low pass filter (LPF) and Decimate 34 so that $$g_n(t) = \cos \omega_0[2aT_n t + T_n(1 - aT_n)]. \quad (8)$$

With $2a = B/T$, $g_n(t)$ is a pure frequency tone of the above mentioned frequency difference. $g_n(t)$ for the nth element of the array would have a frequency which is equal to $\delta f_n$ where $$\delta f_n = \frac{B}{T} T_n \text{ where} \quad (9)$$

B = bandwidth of the transmitted LFM pulse
T = time length of the transmitted LFM pulse
and $$T_n = T_1 - (n-1)\frac{d}{c}\sin\theta \quad (10)$$

This can be seen from FIG. 3 which shows $\delta f_1$ for the first element 12. The LPF and Decimate 34 decimates the original sampling rate of the A/D converter by a factor which is dependent upon the highest frequency and the bandwidth of the replica LFM signal. Accordingly, the sampling rate produced by the LPF and Decimate 34 is the original sampling rate divided by a factor which is substantially the highest frequency of the LFM signal divided by the bandwidth of the LFM signal. Even though the sampling rate is lowered it is still sufficient for retaining the low frequency data that is passed by the LPF and Decimate 34.

With the information provided in FIGS. 3 and 4 for the first element 12, it can be seen that the pure tone frequency $\delta f_n$ of $g_n(t)$ is directly related to range $R_n = cT_n/2$ of the target from the beginning range of the time window of the nth element. With this information, range of the target from the nth element can be determined by calculating $R_n$ and adding $R_n$ to $R_0$.

After removal of the sum frequency terms by the LPF and Decimate 34 the $g_n(t)$ output of each element is fast Fourier transformed by FFT 36 to produce a frequency domain output $G_n(\omega_k)$ for each element. Each $G_n(\omega_k)$ is then converted to an analytic output $Z_n(\omega_k)$ by adder 38 which adds the square root of $-1$ times the Fourier transform of the Hilbert transform of $g_n(t)$ to $G_n(\omega_k)$. This is implemented by adding $G_n(\omega_k)$ for positive $\omega_k$ and $G_n(\omega_k)$ for negative $\omega_k$, with the result that $Z_n(\omega_k) = 2G_n(\omega_k)$ for $\omega_k > 0$ and $Z_n(\omega_k) = 0$ for $\omega_k < 0$. The result is $Z_n(\omega_k)$ which contains a spectrum of frequency resolution cells $\omega_k$ for all values of k from 1 to K where K equals the number of time resolution cells in the currently processed time window and where each frequency resolution cell $\omega_k$ of frequency width of $1/T$ corresponds to a time-resolution cell of time width $1/B$ which corresponds to a range resolution cell of range width $$\frac{c}{2B}.$$

Because the relative delays among the elements result in the target having different frequency shifts, it is necessary to frequency align the output $Z_n(\omega_k)$ of each element for each steering direction $\theta_v$ prior to any beamforming. Each element output $Z_n(\omega_k)$ is frequency shifted at 39 and 40 by $\Delta\omega_n$ where $$\Delta\omega_n = 2\pi \frac{B}{T} \frac{\Delta R_n}{c} \quad (11)$$

where $\Delta R_n = c(T_1 - T_n)$, for each steering direction $\theta_v$ for all values of v from 1 to V to produce element outputs $Z'_n(\omega_k) = Z_n(\omega_k + \Delta\omega_n)$. For each steering direction there are now element outputs $Z'_n(\omega_k)$ which are aligned for further processing. For each steering direction each of the element outputs $Z'_n(\omega_k)$ includes the aforementioned spectrum of frequency resolution cells or bins $\omega_k$.

For explanatory purposes the drawings show in full and the specification has just described the processing of only one partial element output $f'_n(t)$. It is to be understood, however, that the partial element outputs $f'_n(t)$ for all values of n from 1 to N are to be processed simultaneously according to the description. Accordingly, while a single series of components 30, 32, 34, 36, 38, 39 and 40 have been described for processing one partial element output $f'_n(t)$ there are in reality n such series of components for processing the n partial element outputs $f'_n(t)$ for all values of n from 1 to N of a single time window. With such an arrangement the partial element outputs $f'_n(t)$ of a particular time window are processed in parallel. There are also N components 26 and 28 for processing the element outputs $f_n(t)$ in parallel.

In a preferred embodiment of the invention (FIG. 4) multipliers 41 are provided for multiplying each frequency resolution cell or frequency bin $\omega_k$ of each output $Z'_n(\omega_k)$ by $\exp[-i\Phi_n(\omega_k)]$ where $\Phi_n(\omega_k)$ is the phase of a target signal at the nth element, in frequency resolution cell $\omega_k$ from direction $\theta_v$. For explanatory purposes only one frequency resolution cell $\omega_k$ of equal k of three of the element outputs $Z'_n(\omega_k)$ for a particular steering direction $\theta_v$ are shown in full in FIG. 4 and described in detail herein. It is to be understood that a multiplication by a multiplier 41 will be applied to each respective $\omega_k$. The processing described will apply to the frequency resolution cells $\omega_k$ of equal k for all values of k from 1 to K for each of the element outputs $Z'_n(\omega_k)$ for all values of n from 1 to N for each steering direction $\theta_v$ for all values of v from 1 to V. These outputs of equal k are input to respective adders 42 to produce phase aligned sum-beam outputs $V_v(\omega_k, \theta_v)$ for each frequency resolution cell $\omega_k$ for each steering direction $\theta_v$. For planewave beamforming to the various steering directions, each $Z'_n(\omega_k)$ is multiplied by the nth component of the complex conjugate transpose $S_v^*$ of $S_v$, the components of which are:

$$S_n = \exp i\Phi_n, \text{ where} \quad (12)$$

$$\Phi_n = \omega_0 T_n(1 - T_n), \text{ and} \quad (13)$$

$$T_n = (\omega_k - \Delta\omega_n)/(2\omega_0 a) - (n-1)\frac{d}{c}\sin\theta_v. \quad (14)$$

A memory 43 (FIG. 4B) may receive the discrete beam output spectrum $V_v(\omega_k, \theta_v)$ for all $\omega_k$ and output one frequency at a time for all $\theta_v$, the data still being represented herein as $V_v(\omega_k, \theta_v)$.

Means, such as a processor 44, receives the discrete beam outputs $V_v(\omega_k, \theta_v)$ for producing a cross spectral matrix B where the element of the matrix $$B_{vq} = V_v(\omega_k, \theta_v) V_q^*(\omega_k, \theta_q). \quad (15)$$

Means, such as processor 46, receives the matrix output B for producing a covariance estimate $\overline{B}$ where $$\overline{B} = \frac{1}{p} \sum_{i=k-\frac{p}{2}}^{i=k+\frac{p}{2}} B(\omega_i) \text{ where} \quad (16)$$

p = number of sequential frequency resolution cells centered about a frequency resolution cell $\omega_k$;

K = the number of time resolution cells in the currently processed time resolution window; and $\omega_k$ = sequence of frequency differences for all values of k from 1 to K.

The processor 46 utilizes the cross-spectral matrix B to produce an output $\overline{B}$ where $\overline{B}$ is the average over p frequencies of the cross-spectral matrices of the discrete beam outputs $V_v(\omega_i)$ for all values of v from 1 to V, at frequency differences $\omega_k$, which correspond to sequential range resolution cells. The sequence of cells is centered on the cell corresponding to frequency $\omega_k$, the cell for which outputs are to be calculated in the k-th iteration of the beamforming process, where k takes all values from 1 to K, where K equals the number of time resolution cells in the currently processed window.

Means, such as processors 48, 50 and 52, receive the covariance estimate $\overline{B}$ for producing adapted weight vectors W. The processor 48 receives the covariance estimate $\overline{B}$ for producing an inverse covariance estimate $\overline{B}^{-1}$ which in turn is received by processor 52. The processor 52 also receives a vector of beam responses $D_s(\omega_k)$ from the look constraint 50. The look constraint vector $D_s(\omega_k)$ has one component for each v from 1 to V for each steering direction $\theta_s$, where the component $D_{vs}(\omega_k)$ is the response of the beam steered in the direction $\theta_v$ to a target in frequency cell $\omega_k$ in direction $\theta_s$. The component $D_{vs}(\omega_k) = S_s*S_v$, where the components of $S_s$ and $S_v$ are given by equations 12-14, subject to the condition that if the frequency shifts $\Delta\omega_n$ in the nth component of $S_s$ and $S_v$ differ by more than half the frequency cell width $2\pi/T$, then the component is set equal to zero because the response of the corresponding element is in a different frequency cell. Then $D_s$, above, defines the beam response in a single constraint direction $\theta_s$, where the constraint is stated as $W_s*D_s = 1$. The processor 52 then produces adapted weight vectors $W_s$ where $$W_s = \frac{B^{-1}D_s}{D_s*B^{-1}D_s}. \qquad (17)$$

The constraint direction $\theta_s$ is the direction from which the array response is sought, and generally takes on the values of the steering detection $\theta_v$ where v takes all values from 1 to V. The use of a single constraint is illustrative. Multiple constraints exist in the literature and may be substituted, if desired. In this regard refer to "Robust Adaptive Beamforming", *IEEE Trans on Acoustics, Speech and Signal Processing*, Vol 35, pages 1365-1376 (1978) by Cox, Zeskind and Owen. This article is incorporated herein by the reference thereto.

Means, such as multipliers 54 and summer 56, apply the adapted weight vectors $W_v$ for all values v from 1 to V to the respective beam outputs $V_v(\omega_k)$ for all values of k from 1 to K to produce weighted beam outputs $W_v*V_v(\omega_k)$.

The weighted beam outputs $W_v*V_v(\omega_k)$ may be magnitude squared in processor 58 to produce power P where $$P = W*BW. \qquad (18)$$

The output P may then be used to operate a display 60.

It is to be understood that the FIFO 28 will step the time windows sequentially out and back in range so that any target within this range will be detected. While the receiving element partial outputs $f'_n(t)$ of a time window are processed in parallel the sequence of time windows are processed serially. Accordingly, the components 43, 44, 46, 48, 50 and 52 receive the processed partial outputs $f'_n(t)$ of each time window in parallel while the sequence of time windows are received by these components in series.

Figure 5A:
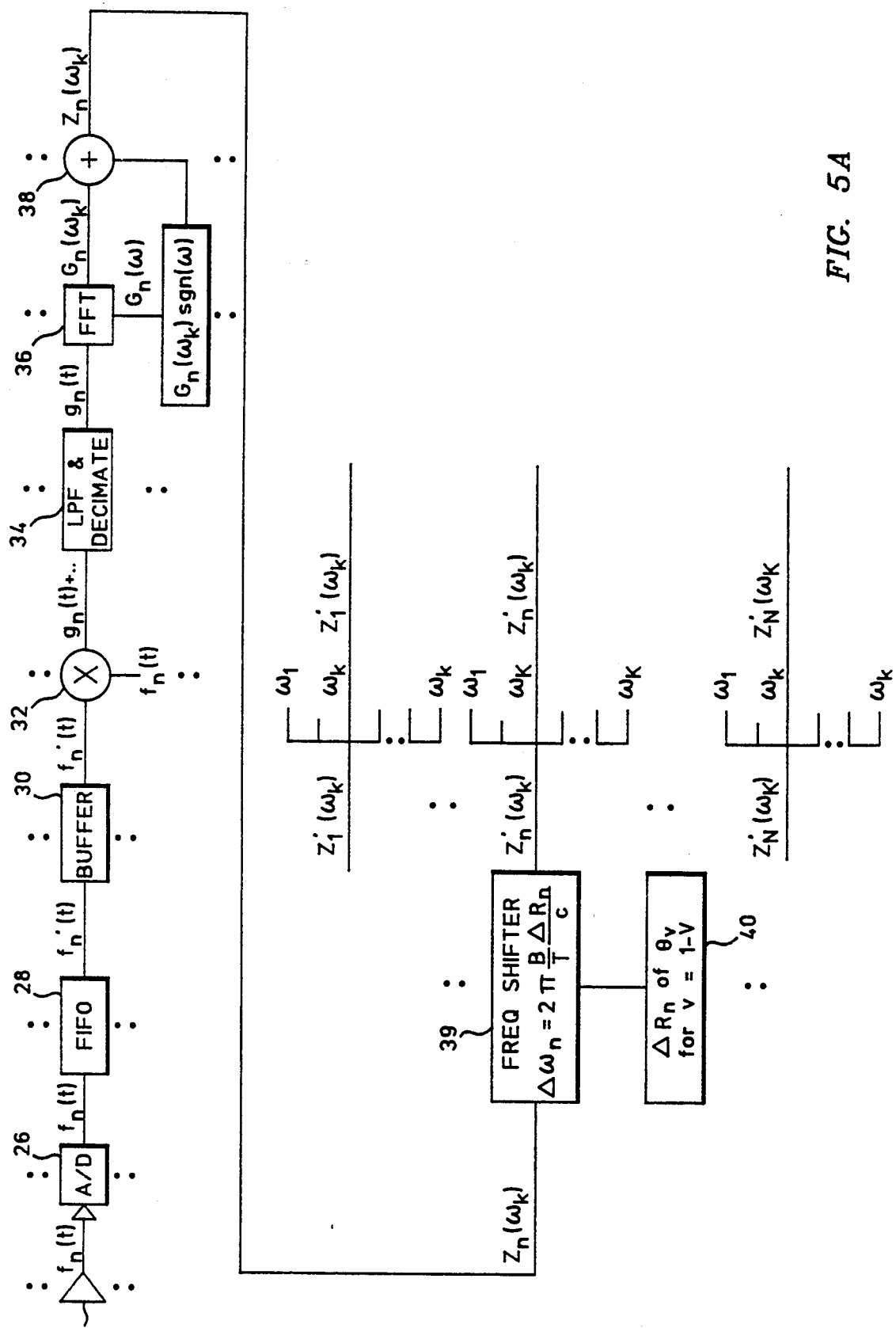
FIG. 5(A&B) is a block diagram of another preferred embodiment of the present invention.
Figure 5B:
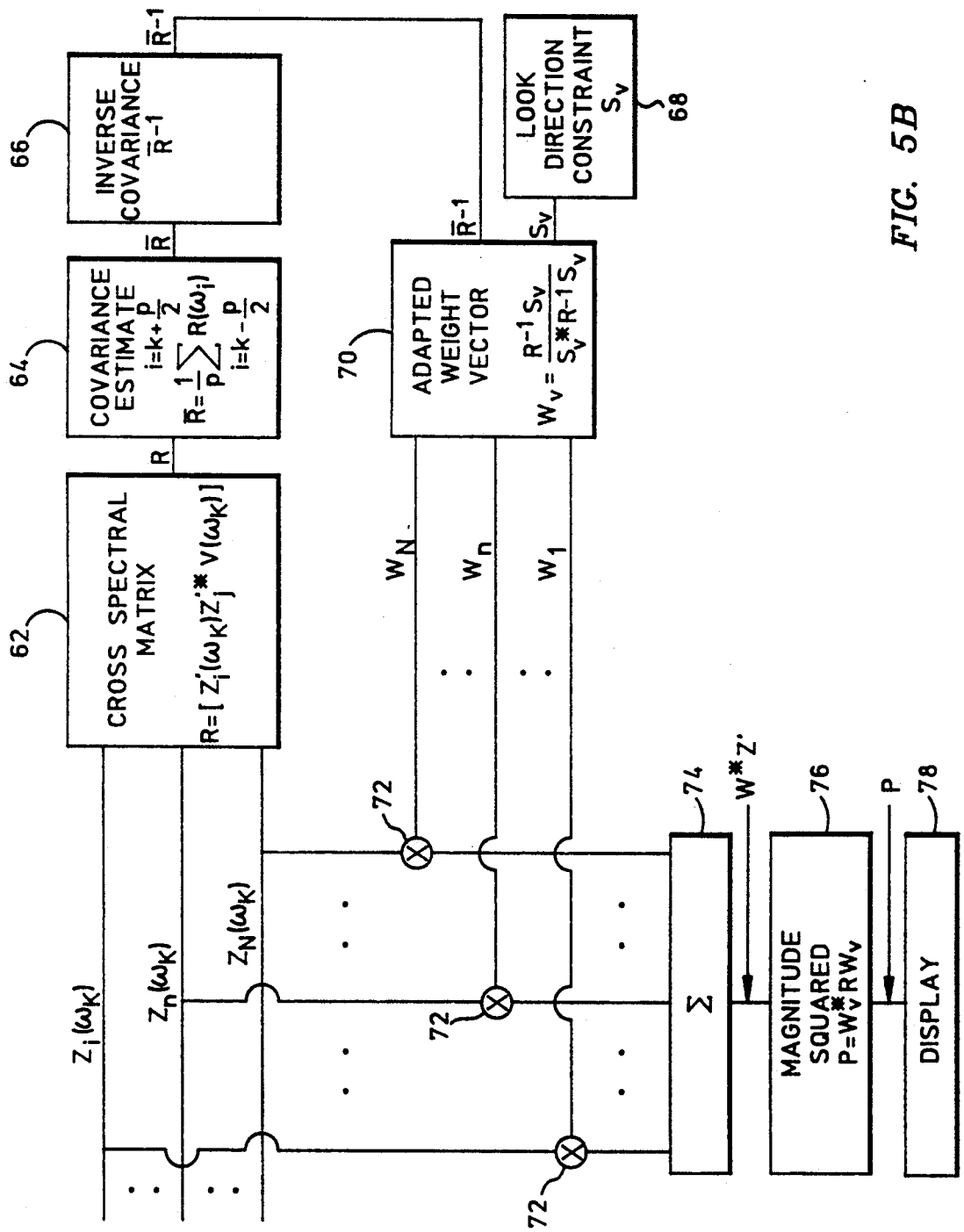

The other embodiment of the invention is shown in FIG. 5. This embodiment is the same as the embodiment shown in FIG. 4 in that it uses the same processors 26, 28, 30, 32, 34, 36, 38, and 40. After the frequency shifter 40 produces aligned element outputs $Z'_n(\omega_k)$ the embodiment shown in FIG. 5 processes these outputs in a different manner. Means, such as processor 62, receives the element outputs $Z'_n(\omega_k)$ for producing a cross-spectral matrix output R, wherein the element $$R_{mn} = Z'_m(\omega_k)Z'_n*(\omega_k). \qquad (19)$$

Means, such as processor 64, receives the matrix output R for producing a covariance estimate $\overline{R}$ where $$R = \frac{1}{p} \sum_{i=k-\frac{p}{2}}^{i=k+\frac{p}{2}} R(\omega_i) \text{ where} \qquad (20)$$

p = number of sequential frequency resolution cells centered about a frequency resolution cell $\omega_k$;

K = the number of time resolution cells in the currently processed time resolution window; and $\omega_k$ = sequence of frequency differences over k from 1 to K.

The processor 64 utilizes the cross spectral matrix R to produce an output $\overline{R}$ where $\overline{R}$ is the average over p frequencies of the cross-spectral matrices of the discrete element outputs $Z'_n(\omega_k)$ for all values of n from 1 to N, at frequency differences $\omega_i$, which corresponds to sequential range resolution cells. The sequence of cells are centered on the cell corresponding to frequency $\omega_k$, the cell for which outputs are to be calculated in the k-th iteration of the beamforming process, where k takes all values from 1 to K, where K equals the number of time resolution cells in the currently processed window. A feature of the invention is that the covariance estimate deals with a small block of data, namely the plurality of cells averaged, which corresponds to a small range extent, as compared to prior art processors which include interference from miles away.

Means, such as processors 66, 68 and 70 receive the covariance estimate $\overline{R}$ for producing adapted weight vectors $W_v$. The processor 66 receives the covariance estimate $\overline{R}$ for producing an inverse covariance estimate $\overline{R}-1$. The processor 70 receives the inverse covariance estimate $\overline{R}^{-1}$ as well as the vectors of element responses $S_v$ given by equations 12-14 for all steering directions $\theta_v$, where v takes all values from 1 to V. The processor 70 produces the weighting vectors $W_v$ according to the formula for all values v from 1 to V wherein V is the number of beams steered. Here a single constraint has been implemented of the form $W_v*S_v = 1$. Multiple constraints may be substituted using methods found in the literature. In this regard refer to "Robust Adaptive Beamforming", *IEEE Trans on Acoustics, Speech and Signal Processing*, Vol 35, pages 1365-1376 (1978) by Cox, Zeskind and Owen. This article is incorporated herein by the reference thereto.

Means, such as multipliers 72 and a summer 74, apply the weights $W_v$ to the element's outputs $Z'_n(\omega_k)$ for all values n from 1 to N to produce weighted element outputs $W_v*Z'$. The weighted element outputs $W_v*Z'$ may then be magnitude squared in processor 76 to produce a coherent beam output P where $P = W_v*RW_v$. This beam output P may then be used to operate a display 78.

In the same manner as for the first described embodiment the components 62, 64, 66, 68 and 70 of the second embodiment receive the processed receiving element outputs $f'_n(t)$ of each time window in parallel and the sequence of time windows in series.

The embodiments described above have incorporated frequency domain and minimum energy adaptive beamforming techniques found in the prior art. A novel aspect of the present invention lies not in the specific adaptive algorithm used, but in the steps leading up to the adaptive algorithm that allows the algorithm to adapt to the target and interference field only in the immediate vicinity of each time or range resolution cell processed. The adaptive algorithms described are exemplary, and it should be understood that they could be replaced by many variants or alternate frequency domain adaptive beamforming techniques that would also accomplish the objectives of the invention. For purposes of illustration, the exemplary adaptive algorithms are relatively simple, and do not include improvements that may be found in the literature. It should be understood that the invention may be modified to overcome the known problem of coherent signal and interference destroying the adaptive performance. This effect will be important in the case of one or more interferers lying in the same time or range resolution cell as multiple targets. One alternative to solving this problem is the "spatial smoothing algorithm" described in an article entitled "Adaptive Beamforming for Coherent Signals and Interference", *IEEE Transactions on Acoustics, Speech and Signal Processing*, Vol. ASSP-33, No. 3, June 1985 by Shan and Kailath. This article is incorporated herein by the reference thereto.

Exemplary embodiments have been described to achieve the objects of the invention. It should be understood that the method accomplished by the invention can be implemented by other embodiments. The method of the invention would process an echo received by an array of N receiving elements from a target at range R ensonified by an LFM signal of bandwidth B transmitted from the position of a first element at a time $t=0$ for a duration T. Each element's output $f_n(t)$ is received over the element's total receiving time and selected therefrom are time-window element outputs $f'_n(t)$ which are discrete portions of $f_n(t)$, each time window extending from arbitrary initial time $T_0$ to final time $T_f$, where for each window, $T_0$ and $T_f$ are the same for all $f'_n(t)$, $T_f$ is spaced from $T_0$ no more than T, and a target observation time $T_n$ for any element is less than $T_f - T_0$ and is defined such that the arrival time of an echo from range R, if the target is within the window, is given by $t = T_0 + T_n$. As shown in FIG. 4(A & B) this may be accomplished by the A/D converter 26, FIFO 28 and buffer 30.

The method further includes multiplying the element outputs $f'_n(t)$ by a replica of the transmitted LFM signal and filtering to remove unwanted sum-frequency terms for producing element frequency-difference outputs $g_n(t)$, the outputs $g_n(t)$ being tones with frequencies directly proportional to the time $T_n$ of the target from the time $T_0$ so that the range $R = c/2(T_0 + T_n) + \Delta R_n$, where c is the speed of sound, and $\Delta R_n$ is the distance by which R exceeds each element's range to the target. With this information range and bearing of the target from the array can be more easily ascertained by dealing with amplitude, phase and frequency parameters of a cw pulse. As shown in FIG. 4, this may be accomplished by the multiplier 32 and the LPF and Decimate 34.

The method may further include converting the element frequency-difference outputs $g_n(t)$ to analytic signals in the Fourier transform frequency domain $Z_n(\omega_k)$ wherein $Z_n(\omega_k)$ contains a spectrum of frequency resolution cells $\omega_k$ for all values of k from 1 to K where K equals the number of time resolution cells in the currently processed window, where each frequency resolution cell $\omega_k$ has a frequency width of $1/T$, and corresponds to a time-resolution cell of time width $1/B$, which corresponds to a range resolution cell of range width $c/2B$. As shown in FIG. 4, this may be accomplished by the FFT 36.

Still further the method may include shifting the frequency difference element outputs $Z_n(\omega_k)$ in the frequency domain to produce element outputs $Z'_n(\omega_k)$ which are aligned to compensate for the range differences $\Delta R_n$ for each steering direction $\theta_v$ for all values of v from 1 to V, the frequency shifts being $$\Delta \omega_n = 2\pi \frac{B}{T} \frac{\Delta R_n}{c}$$

(see Equation 11), thereby making R the apparent range of the target at all of the elements. As shown in FIG. 4, this may be accomplished by the frequency shifter 40.

Additional methods may include adaptive beamforming the element outputs $Z_n'(\omega_k)$ or first forming the element outputs $Z_n'(\omega_k)$ into beam outputs and then adaptive beamforming them. In either event the preprocessing of the element outputs enables the adaptive beamforming to function more effectively by dealing with local parameters rather than parameters extracted from long averages.

While the invention can be implemented by the various components described hereinabove, it is to be understood that the invention could be implemented by an appropriate program for a general purpose computer. The performance of both embodiments subsequent to the buffer 30 has been modeled by computer programs. These programs are annexed to this specification as Appendix A and are incorporated by reference herein.

The program "ALMABEAM.CCP", written in the C++ language, models the first embodiment shown in FIG. 4(A&B). The model defines positions for a field of scatterers within a single range window, a set of array element positions and a source position, and calculates the travel time for each scatterer receive element combination. A steering direction is defined and a set of independent beam directions is chosen. The steering vectors and constraint vector components are calculated for each beam direction. The mathematical expression for the mixer output (Equation 8) is used to calculate the frequency and phase of each element response contribution for each beam direction. The element responses are frequency and phase shifted to align to each beam direction, and the response contributions for each element are frequency binned and summed. The element responses are summed to form each beam output. The beam outputs are cross multiplied to form the covariance estimates, which are averaged over frequency. The conventional response is computed and then the adaptive weights and responses are computed. The process is repeated for each frequency and then the program loops through a full set of steering angles and generates response plots.

The program "ALMAELEM.CPP", written in the C++ language, models the second embodiment shown in FIG. 5(A&B). As in the "ALMABEAM.CPP" model, this model defines positions for a field of scatterers within a single range window, a set of array element positions and a source position, and calculates the travel time for each scatterer receive element combination. A steering direction is defined and the mathematical expression for the mixer output is used to calculate the frequency and phase of each element response contribution. The response contributions are frequency shifted and binned by frequency. The contributions for each frequency are summed and the results cross multiplied to form the covariance estimates which are averaged over frequency. The conventional beam response is computed and then the adaptive weights and response are computed. The process is repeated for each frequency and then the program loops through a full set of steering angles and generates response plots.

Obviously, many modifications and variations of the present invention are possible in light of the above teachings. It is therefore to be understood that within the scope of the appended claims the invention can be practiced otherwise than as specifically described.

APPENDIX A

ALMABEAM.CPP

```
/*                 ALMABEAM.CPP                                                    */
/*         ACTIVE LFM MIXER ADAPTIVE ABF, BEAM-BASED, 1 RANGE-WINDOW MODEL         */
/*         CSM AVERAGED OVER FREQUENCY (RANGE)                                     */

/*     James C. Lockwood                                                           */
/*     Naval Command, Control and Ocean Surveillance Center                        */
/*     Research, Development, Test and Evaluation Division                         */
/*     16 September 1992                                                           */ include <graphics.h>
include <string.h>
#include <conio.h>
#include <math.h>
#include <complex.h>
#include <iostream.h>
#include <stdlib.h>
#include <stdio.h>
#include <dos.h>
#include <float.h>
#include <matrix.h>
#include <plotvga.h>
include <plothp.h> define CLIP_ON 1 include <sonarobj.h>
include <ctype.h>
#include "almainpt.h"

extern unsigned _stklen = 54321U;

/*     Prototype for optional matrix inversion on DSP32 processor                  */ extern "C" complex minvert(complex *AA, int NN, int *LL, int *MM);

/*     Prototype for random number generator from "Numerical Recipes"              */ extern "C" float ran1(int &idum);

const Elements = ELEMENTS;

/*     Prototype for function that calculates element responses for arbitrary number of indep
       beams centered on steering direction                                        */ int IQMat(double Thetas, double Phis, float huge (*IQrBasePtr)[Elements],
        float huge (*IQiBasePtr)[Elements], double (*SteerBasePtr)[Elements],
        double (*Steer0BasePtr)[Elements], complex (*DBasePtr),
        T *TimeBasePtr, Target *ScatBasePtr, XYZPos Rec_array[], int Nfreqs,
        int Beams_in_covar, double Freq0, double Amod, double C0, int Scatterers,
        double F_res, int Freq_Offset, int Ranges, int NAngles, double R0, double Range_cell);

/*     Prototype for function that lays out scatterer distribution                 */

Target *Scatdist (int &Scatterers, complex &Noise, int Ranges, double Range_cell, double R0);

int main()        // MAIN PROGRAM
{

//*************Run Parameters****************************** const double Polar_Max_Radius = POLAR_MAX_RADIUS; // dB - Max scale for Polar plots
        const double Angle_Increment = pow(2.,LOG2_ANGLE_INCREMENT); // Must be a power of 2.
        const Beams = BEAMS; // Number of angles plotted
        const double Bandwidth = BANDWIDTH; // Pulse Bandwidth - Hz
        const double Freq0 = FREQ0; // Frequency at start of sweep
```

```
        const int Beams_in_covar = BEAMS_IN_COVAR; //No. of beams in Cross-Spectral Matrix
        const Frequencies_Averaged = FREQUENCIES_AVERAGED; // No. of frequencies averaged
        const double Pulse_length =PULSE_LENGTH; // Pulse length - sec
        const Ranges_Calculated = RANGES_CALCULATED; // No. of Ranges Calculated // These start about R0+Frequencies_Averaged/2*Range_Cell const Ranges = Ranges_Calculated;   // Number of ranges for which scatterers defined
        double C0 = 1500.; // sound speed m/sec
        double R0 = RANGE0; // Range at start of window - m
        double Lambda = C0/(Freq0+Bandwidth); // Wavelength at top of sweep
        double Element_d = Lambda*LAMBDA_SPACING; // Nominal Element spacing - m
        double Array_l = (Elements-1)*Element_d; // Array length - m
        int NAngles = 2.*Array_l/Lambda +1.5;   // Number of independent directions in sin space.

double Randomization = RANDOMIZATION; // Allows randomized posns - fraction of spacing, 2 sided //*************Run Parameters End****************************** double Range_cell = C0/2./Bandwidth;

int idum = -1;
        cout << "Angles = " << NAngles <<" Beams in Covar = " << Beams_in_covar << '\n';
        double Amod = Bandwidth/Freq0/Pulse_length/2.;
        double F_res = 1./Pulse_length;
        complex Noise;
        complex IQC;
        static complex IQ[Elements];
        static complex IQTrans[Beams_in_covar];
        int Scatterers;
        double T0;
        int Freq_Av = Frequencies_Averaged;
        const Freq_Offset = 0;
        const Nfreqs = Ranges_Calculated+Frequencies_Averaged-1;
        complex OneVec[Beams_in_covar];

//      Initialize all components of OneVec to (0.,0.)

Matinit(&OneVec[0],Beams_in_covar,1,complex(0.,0.));
        OneVec[0] = complex(1./Elements,0.);
        double Freqcell, Arg;
        int i,j,k,l;
        static XYZPos Rec_array[Elements];
        Adaptive = 1;    // Hard wire in Adaptive calc.
        char Filename_base[20];
        char Filename[13];
        int Plot_no=0;
        Plotvga Plot;
        Plothp Plotf;

//      CALL FUNCTION THAT LAYS OUT SCATTERERS

Target (*ScatPtr);
        Target (*ScatBasePtr);
        ScatBasePtr = Scatdist(Scatterers, Noise, Ranges, Range_cell, R0);

//              Dynamic Allocations of Arrays**********

T *TimeBasePtr;
        T *TimePtr; // Time array is vector of T
        if((TimeBasePtr = new T [Elements*Ranges*Scatterers]) == NULL){
                cout << "Not Enough Memory to Allocate Time Array\n";
                exit(1);

}       // Array of T to contain return times for each scatterer/element
cout << "Size of Time Array = " << Elements*Ranges*Scatterers*4l << '\n';
TimePtr=TimeBasePtr;

// Element response array is represented by real and imag matrices float huge (*IQr)[Elements];
float huge (*IQrBasePtr)[Elements];
if((IQrBasePtr = new float huge [Nfreqs*Beams_in_covar][Elements]) == NULL){
        cout << "Not Enough Memory to Allocate IQr Array\n";
        exit(1);
}       // Array of float to contain real part of element responses
cout << "Size of IQr and IQi Arrays = " << Elements*Nfreqs*Beams_in_covar*4l << '\n';

float huge (*IQr1)[Elements];
float huge (*IQi1)[Elements];
float huge (*IQi)[Elements];
float huge (*IQiBasePtr)[Elements];
if((IQiBasePtr = new float huge [Nfreqs*Beams_in_covar][Elements]) == NULL){
        cout << "Not Enough Memory to Allocate IQi Array\n";
        exit(1);
}       // Array of float to contain imaginary part of element responses complex (*IQBPtr)[Beams_in_covar];
complex (*IQBBasePtr)[Beams_in_covar];
if((IQBBasePtr = new complex [Nfreqs][Beams_in_covar]) == NULL){
        cout << "Not Enough Memory to Allocate IQB Array\n";
        exit(1);
```

```
}          // Array of complex to contain beam responses
cout << "Size of IQB Array = " << Nfreqs*Beams_in_covar*161 << '\n';
void *IQB = IQBBasePtr;

complex (*DPtr);
complex (*DBasePtr);
if((DBasePtr = new complex [Nfreqs*Beams_in_covar]) == NULL){
      cout << "Not Enough Memory to Allocate D Array\n";
      exit(1);
}          // Array of complex to contain constraint vectors
cout << "Size of D Array = " << Nfreqs*Beams_in_covar*161 << '\n';

double (* SteerBasePtr)[Elements];
if((SteerBasePtr = new double [Nfreqs][Elements]) == NULL){
      cout << "Not Enough Memory to Allocate Steer Vector Array\n";
      exit(1);
}          // Array of double to contain steering vector arguments
cout << "Size of Steer Vector Arrays = " << Nfreqs*Elements*81 << '\n';

double (* Steer0BasePtr)[Elements];
if((Steer0BasePtr = new double [Nfreqs][Elements]) == NULL){
      cout << "Not Enough Memory to Allocate Steer0 Vector Array\n";
      exit(1);
}          // Array of double to contain first steering vector arguments complex *CSMBasePtr;
if((CSMBasePtr = new complex [Beams_in_covar*Beams_in_covar]) == NULL){
      cout << "Not Enough Memory to Allocate CSM Array\n";
      exit(1);
}          // Array of complex to hold cross-spectral matrices
cout << "Size of CSM Arrays = " << Beams_in_covar*Beams_in_covar*161 << '\n';
```

//        Array for Average CSM

```
complex *AvgCSMBasePtr;
if((AvgCSMBasePtr = new complex [Beams_in_covar*Beams_in_covar]) == NULL){
      cout << "Not Enough Memory to Allocate CSM Array\n";
      exit(1);
}          // Array of complex to hold average CSM
```

//        Work Array for CSMs to be added

```
complex *WrkCSMBasePtr;
if((WrkCSMBasePtr = new complex [Beams_in_covar*Beams_in_covar]) == NULL){
      cout << "Not Enough Memory to Allocate CSM Array\n";
      exit(1);
}          // Array of complex to hold CSM Work Array complex *WhtNBasePtr;
if((WhtNBasePtr = new complex [Beams_in_covar*Beams_in_covar]) == NULL){
      cout << "Not Enough Memory to Allocate WhtN Array\n";
      exit(1);
}          // Array of complex to hold diagonal white noise matrix
```

//   Form Identity matrix of size Beams_in_covar pointed to by WhtNBasePtr

```
Idn(WhtNBasePtr,Beams_in_covar);
```

//   Multiply each element of same matrix by Noise*complex(Elements,0.)

```
Matscal(WhtNBasePtr,Beams_in_covar,Beams_in_covar,Noise*complex(Elements,0.));

float (*OutputPtr)[Beams];
float (*OutputBasePtr)[Beams];
if((OutputBasePtr = new float [Nfreqs][Beams]) == NULL){
      cout << "Not Enough Memory to Allocate Output Array\n";
      exit(1);
}          // Array of float to hold conventional output
cout << "Size of Output Arrays = " << Nfreqs*Beams*41 << '\n';
void *OutPtr = OutputBasePtr;
```

//   Initialize all components of matrix pointed to by OutPtr to -200.

```
Matinit((float *)OutPtr, Nfreqs, Beams, -200.);
```

//        Array for Adaptive Outputs Defined Below

```
float (*AOutputPtr)[Beams];
float (*AOutputBasePtr)[Beams];
if((AOutputBasePtr = new float [Nfreqs][Beams]) == NULL){
      cout << "Not Enough Memory to Allocate Output Array\n";
      exit(1);
}          // Array of float to hold Adaptive Output
void *AOutPtr = AOutputBasePtr;
```

//   Initialize all components of matrix pointed to by AOutPtr to -200.

```
Matinit((float *)AOutPtr, Nfreqs, Beams, -200.);
```

//   END OF ARRAY ALLOCATIONS

```
XYZPos Origin(0.,0.,0.);
XYZPos Apoint(1.,1.,1.);   // Arbitrary Point
```

```
                Target Source(0.,0.,0.,1.);
                Line Aline(Origin,Apoint);    // Initialize Aline
                for(i=0; i<Elements; i++){    // Lay out Receiving Array //**********Note that array is centered on origin Rec_array[i].Y = Element_d*(i + Randomization*(1.0 - 2.0*ranl(idum)))
                        -(Elements-1)*Element_d/2.0;
                };

cout << "Size of Scatterer Array = " << Ranges*Scatterers*321 << '\n';
                ScatPtr = ScatBasePtr; // Initialize pointer into scatterer array
//      TimePtr is already at beginning of array for (i=0;i<Ranges;i++){         //Compute return time for each scatterer[i,j]
                    for (j=0;j<Scatterers;j++){ //at each element[k].
                        T0=Aline.Distance(Source,*ScatPtr) - 2*R0;
                            for (k=0;k<Elements;k++){
                                TimePtr->Time=(T0+Aline.Distance(Rec_array[k],*ScatPtr))/C0;
                                TimePtr++;
                            } ;
                        ScatPtr++;
                    } ;
                };

//                  Steering Angle Loop double Thetas,Phis;
            int ibeam;
            for(ibeam=0; ibeam<Beams; ibeam++){
                int Clone = 0; /*      Assumes array is straight line on Y-axis
                                       and suppresses calculation of mirror image */
                Thetas = ibeam*Angle_Increment;
                if ((Thetas > 90.) && (Thetas < 180.))
                            Clone = (180. - Thetas)/Angle_Increment;
                if (Thetas > 270.) Clone = (540. - Thetas)/Angle_Increment;
                Phis = 0.;
                if(Clone==0){

/*      Calculate IQ vector components for all Freqs to be averaged
                        for all Beams in cross-spectral matrix.  This is somewhat
                        inefficient if all independent beams are used, since they
                        could, in principle be calculated only once.  However, this
                        approach allows use of an arbitrary number of beams in the
                        covariance, and also permits calculation of the constraint vectors
                        D as a by product.   */

IQMat(Thetas, Phis, IQrBasePtr,IQiBasePtr, SteerBasePtr,Steer0BasePtr, DBasePtr,
                    TimeBasePtr,ScatBasePtr, &Rec_array[0], Nfreqs, Beams_in_covar,Freq0, Amod, C0, Scatterers, F_res,Freq_Offset, Ranges,
                    NAngles, R0, Range_cell);

//                  Form the Beam-Based IQ as sum over elements for(i=0;i<Nfreqs;i++){
                        IQBPtr = IQBBasePtr + i;
                        for(j=0;j<Beams_in_covar;j++){
                            IQr=IQrBasePtr+i*Beams_in_covar+j;
                            IQi=IQiBasePtr+i*Beams_in_covar+j;
                            (*IQBPtr)[j] = complex(0.,0.);
                            for(k=0;k<Elements;k++){
                                (*IQBPtr)[j] += complex((*IQr)[k],(*IQi)[k]);
                            };
                        };
                    };

cout << "....\b\b\b";

// Form the first Frequency-Averaged CSM for the
                    // first frequences and beams to be averaged
                    // Note that the avg CSM has not yet been divided
                    // by the number Averaged nor has the white noise
                    // been injected.

//      Initialize all components of matrix pointed to by AvgCSMBasePtr to (0.

Matinit(AvgCSMBasePtr, Beams_in_covar, Beams_in_covar, complex(0.,0.));
                    if (Adaptive != 0){
                        for( i=0; i<Frequencies_Averaged; i++){
                            IQBPtr = IQBBasePtr + i;
                            IQB = IQBPtr;

/*      Conjugate transpose vector pointed to by
                                    IQB and store in IQTrans */

Trnspz((complex *)IQB,&IQTrans[0],Beams_in_covar,1);

/*      Matrix outer product of vector at
                                    IQB and transpose, store in matrix
                                    WrkCSMBasePtr */
```

```
                                Matmult((complex *)IQB,&IQTrans[0], WrkCSMBasePtr,
                                        Beams_in_covar, 1, Beams_in_covar);

/*      Add Matrix at WrkCSMBasePtr to
                                matrix at AvgCSMBasePtr */

Matadd(AvgCSMBasePtr, WrkCSMBasePtr,
                                        Beams_in_covar, Beams_in_covar);
                        };
                };
        }; // End of if Clone==0

// Now freq is going to run from the middle of the average
        // (Frequencies_Averaged+1)/2 to Nfreqs - (Frequencies_Averaged)/2.

static int Larray[Beams_in_covar];
        static int Marray[Beams_in_covar];
        static complex Weight[Beams_in_covar];
        static complex Weight_Trans[Beams_in_covar];
        static complex InterVec[Beams_in_covar];
        complex Pow;
        for( i=(Frequencies_Averaged+1)/2-1; i<Nfreqs-Frequencies_Averaged/2; i++){
                printf("%3d\b\b\b",i);
                OutputPtr = OutputBasePtr + i;
                AOutputPtr = AOutputBasePtr +i;
                IQBPtr = IQBBasePtr + i;
                IQB = IQBPtr;
                DPtr=DBasePtr + i*Beams_in_covar;

if(Clone){
                        (*OutputPtr)[ibeam] = (*OutputPtr)[Clone];
                        (*AOutputPtr)[ibeam] = (*AOutputPtr)[Clone];
                }
                else{

//*****************Define instantaneous CSM*********************

/*      Initialize all components of matrix pointed to
                                by CSMBasePtr to (0.,0.) */

Matinit(CSMBasePtr, Beams_in_covar,Beams_in_covar,complex( 0.,0.));

// Select a Row of the IQ matrix and outer prod with it's transpose
                // to fill in the elements of the CSM matrix for this frequency.

/*      Conjugate transpose vector pointed to by IQB and
                                store in IQTrans */

Trnspz((complex *)IQB,&IQTrans[0],Beams_in_covar,1);

/*      Matrix outer product of vector at IQB and
                                transpose, store in matrix WrkCSMBasePtr */

Matmult((complex *)IQB,&IQTrans[0], WrkCSMBasePtr, Beams_in_covar, 1, Beams_in_
covar);

/*      Add matrix at WrkCSMBasePtr to one at CSMBasePtr */

Matadd(CSMBasePtr, WrkCSMBasePtr, Beams_in_covar,Beams_in_covar);

//                      Add in the White Noise

/*      Add matrix at WhtNBasePtr to matrix at CSMBasePtr */

Matadd(CSMBasePtr, WhtNBasePtr, Beams_in_covar,Beams_in_covar);

//******************End of CSM definition
        // Form S*RS, where S is vector with 1 in the first position and 0's elsewhere
                        /*      Matrix postmultiply OneVec by CSMBasePtr and store in
                                InterVec */

Matmult(&OneVec[0], CSMBasePtr, &InterVec[0],1,Beams_in_covar,
                                        Beams_in_covar);

/*      Vector inner product InterVec by OneVec and store
                                in Pow */

Matmult(&InterVec[0], &OneVec[0], &Pow, 1,Beams_in_covar, 1);
                        if(Pow != complex(0.,0.)) (*OutputPtr)[ibeam]
                                = 10.*log10(abs(Pow));

//                              Adaptive
//              Add in the white noise and leave the result in the work array if (Adaptive != 0){

/*      Copy matrix at AvgCSMBasePtr to matrix at
                                                WrkCSMBasePtr */
```

```
                    Matcopy(AvgCSMBasePtr, WrkCSMBasePtr,Beams_in_covar,Beams_in_covar);

/*      Multiply each component of WrkCSMBasePtr
                            matrix by 1/Frequencies_Averaged */

Matscal(WrkCSMBasePtr,Beams_in_covar,Beams_in_covar,
                            complex(1./Frequencies_Averaged,0.));

/*      Add matrix at WhtNBasePtr to matrix at
                            WrkCSMBasePtr */

Matadd(WrkCSMBasePtr, WhtNBasePtr, Beams_in_covar,Beams_in_covar);

//              Invert the Average CSM cout<< "    " << "\b\b\b";

//              386 Version Matrix Inversion

//                  Minv(WrkCSMBasePtr, Beams_in_covar, &Larray[0], &Marray[0]);

//              DSP32 Version Matrix Inversion minvert(WrkCSMBasePtr, Beams_in_covar, &Larray[0], &Marray[0]);

//              Now form S*R-1S and R-1S and get weight vector
//              Then calculate adaptive output power and store in array.

//*****************Calculate Weights using beam responses***************
                            /*      Premultiply DPtr by WrkCSMBasePtr and
                                    store in Weight */

Matmult(WrkCSMBasePtr, DPtr, &Weight[0],
                                    Beams_in_covar,Beams_in_covar, 1);

/*      Conjugate transpose vector pointed to by
                            DPtr and store in InterVec */

Trnspz(DPtr,&InterVec[0],Beams_in_covar,1);

/*      Vector inner product InterVec by Weight
                                    and store in Pow */

Matmult(&InterVec[0], &Weight[0], &Pow, 1, Beams_in_covar, 1)

/*      Multiply each component of Weight by 1/Pow */

Matscal(&Weight[0], Beams_in_covar,1, complex(1.,0.)/Pow);

//****************End of Weight Calculation****************************
                            /*      Conjugate transpose vector Weight and store in
                                    Weight_Trans */

Trnspz(&Weight[0], &Weight_Trans[0], Beams_in_covar,1);

/*      Postmultiply Weight_Trans by CSMBasePtr
                                    and store in InterVec */

Matmult(&Weight_Trans[0], CSMBasePtr, &InterVec[0],
                                    1, Beams_in_covar,Beams_in_covar);

/*      Vector inner product InterVec by Weight
                                    and store in Pow */

Matmult(&InterVec[0], &Weight[0], &Pow, 1, Beams_in_covar,1);
                            if(Pow != complex(0.,0.)) (*AOutputPtr)[ibeam]
                                    = 10.*log10(abs(Pow));

//              UPDATE AVERAGE CS MATRIX FOR NEXT FREQUENCY
//              BY SUBTR LOWEST AND ADDING NEXT HIGHER FREQ if(i<Nfreqs-Frequencies_Averaged/2-1){

/*      Reinitialize matrix pointed to by
                                    AvgCSMBasePtr to (0.,0.) */ if (Freq_Av == 1) Matinit(AvgCSMBasePtr,
                                    Beams_in_covar,Beams_in_covar, complex(0.,0.));

if(Freq_Av != 1){
                                            IQBPtr = IQBBasePtr + i -
                                                    ((Frequencies_Averaged+1)/2-1);
                                            IQB = IQBPtr;

/*      Conjugate transpose
                                                    vector pointed to
                                                    by IQB and store
                                                    in IQTrans */
```

```
                                              Trnspz((complex *)IQB,&IQTrans[0],Beams_in_cova
r,1);

/*      Matrix outer product
                                                      of vector at IQB
                                                      and transpose, store
                                                      in matrix
                                                      WrkCSMBasePtr */

Matmult((complex *)IQB,&IQTrans[0], WrkCSMBaseP
tr,
                                                      Beams_in_covar, 1, Beams_in_covar);

/*      Subtract matrix at
                                                      WrkCSMBasePtr from
                                                      one at
                                                      AvgCSMBasePtr */

Msubtr(AvgCSMBasePtr, WrkCSMBasePtr,
                                                      Beams_in_covar, Beams_in_covar);
                                      IQBPtr = IQBBasePtr + i + (Frequencies_Averaged/2+1);
                                      IQB = IQBPtr;

/*      Conjugate transpose vector
                                                      pointed to by IQB and store
                                                      in IQTrans */

Trnspz((complex *)IQB,&IQTrans[0], Beams_in_covar,1);

/*      Matrix outer product of vector at IQB and transpose,
                                                      store in matrix
                                                      WrkCSMBasePtr */

Matmult((complex *)IQB,&IQTrans[0], WrkCSMBasePtr,
                                                      Beams_in_covar, 1, Beams_in_covar);

/*      Add matrix at WrkCSMBasePtr
                                                      to matrix at AvgCSMBasePtr */

Matadd(AvgCSMBasePtr, WrkCSMBasePtr,
                                                      Beams_in_covar,Beams_in_covar);
                                                      };
                                              };
                                      };
                              };
                      };
              );
//      PLOT ON SCREEN AND TO FILES IF DESIRED
        cout << "Press any key...";
        getche();
        char Symbol[] = "o";
        double Xmax = R0*1.2;
        double PlotX, PlotY;
        Plot.Ldir(90.);
        Plot.Plotinit();
        Plot.Locate(10.,90.,30.,110.);
        Plot.Scale(-Xmax,Xmax,-Xmax,Xmax);
        Plot.Axes(-Xmax,Xmax,Xmax/10.,-Xmax,-Xmax,Xmax,Xmax/10.,-Xmax,
                  2,2,1.,0.);
        Plot.Axes(-Xmax,Xmax,Xmax/10.,Xmax,-Xmax,Xmax,Xmax/10.,Xmax,
                  2,2,0.,1.);
        ScatPtr = ScatBasePtr;
        for(i=0;i<Ranges;i++){
                for(j=0;j<Scatterers;j++){
                        strcpy (Symbol, "o");
                        if(ScatPtr->Strength > 1.) strcpy(Symbol, "X");
                        if(ScatPtr->Strength < 1./4.) strcpy(Symbol, ".");
                        PlotX = ScatPtr->X();
                        PlotY = ScatPtr->Y();
                        Plot.Label(PlotX, PlotY,Symbol);
                        ScatPtr++;
                }
        }
        Plot.Plotclose();
        Plotvga PolPlot;
        Plothp PolPlotf;
        for( i=(Frequencies_Averaged+1)/2-1; i<Nfreqs-Frequencies_Averaged/2; i++){
                OutputPtr = OutputBasePtr + i;
                OutPtr = OutputPtr;
                PolPlot.Plotinit();
                PolPlot.Line(1,4.);
                PolPlot.Polax(Polar_Max_Radius-40.,Polar_Max_Radius,10.,10.);
                double Dthet = Angle_Increment;
                PolPlot.Line(0,4.);
                PolPlot.Plotpol((float *)OutPtr, Beams, Dthet, 40.-Polar_Max_Radius);
                PolPlot.Plotclose();
                if(Adaptive != 0){
                        AOutputPtr = AOutputBasePtr + i;
                        AOutPtr = AOutputPtr;
```

```
                    PolPlot.Plotinit();
                    PolPlot.Line(1,4.);
                    PolPlot.Polax(Polar_Max_Radius-40.,Polar_Max_Radius,10.,10.);
                    PolPlot.Line(0,4.);
                    PolPlot.Plotpol((float *)AOutPtr, Beams, Dthet, 40.-Polar_Max_Radius);
                    PolPlot.Plotclose();
            };
    };
    printf("\nDo you want to create plot files?\n");
    printf("\t(Y/N)\n");
    int Plotter = 0;
    if (toupper(getche()) == 'Y') Plotter = 1;
    if(Plotter){
            cout << "\nEnter filename base up to 6 characters for all HPGL plots: " ;
            cin >> Filename_base;
            Filename_base[6]=NULL;
    };
    char Filename_suffix[7];
    if (Plotter){
            Plotf.Ldir(90.);
            sprintf(Filename_suffix, "%02d.PLT",Plot_no);
            Plot_no++;
            strcpy(Filename,Filename_base);
            strcat(Filename,Filename_suffix);

Plotf.Plotinit(8.,11.,Filename);
    Plotf.Locate(10.,90.,30.,110.);
    Plotf.Scale(-Xmax,Xmax,-Xmax,Xmax);
    Plotf.Axes(-Xmax,Xmax,Xmax/10.,-Xmax,-Xmax,Xmax,Xmax/10.,-Xmax,
                    2,2,1.,0.);
    Plotf.Axes(-Xmax,Xmax,Xmax/10.,Xmax,-Xmax,Xmax,Xmax/10.,Xmax,
                    2,2,0.,1.);
    ScatPtr = ScatBasePtr;
    for(i=0;i<Ranges;i++){
            for(j=0;j<Scatterers;j++){
                    strcpy (Symbol, "o");
                    if(ScatPtr->Strength > 1.) strcpy(Symbol, "X");
                    if(ScatPtr->Strength < 1./4.) strcpy(Symbol, ".");
                    PlotX = ScatPtr->X();
                    PlotY = ScatPtr->Y();
                    Plotf.Label(PlotX, PlotY,Symbol);
                    ScatPtr++;
            }
    }
    Plotf.Plotclose();
};
if(Plotter){
    for( i=(Frequencies_Averaged+1)/2-1; i<Nfreqs-Frequencies_Averaged/2; i++){
            OutputPtr = OutputBasePtr + i;
            OutPtr = OutputPtr;
            sprintf(Filename_suffix, "%02d.PLT",Plot_no);
            Plot_no++;
            strcpy(Filename,Filename_base);
            strcat(Filename,Filename_suffix);
            PolPlotf.Plotinit(8.,11.,Filename);
            PolPlotf.Line(1,4.);
            PolPlotf.Polax(Polar_Max_Radius-40.,Polar_Max_Radius,10.,10.);
            double Dthet = Angle_Increment;
            PolPlotf.Line(0,4.);
            PolPlotf.Plotpol((float *)OutPtr, Beams, Dthet, 40.-Polar_Max_Radius);
            PolPlotf.Plotclose();
            if(Adaptive != 0){
                    AOutputPtr = AOutputBasePtr + i;
                    AOutPtr = AOutputPtr;
                    sprintf(Filename_suffix, "%02d.PLT",Plot_no);
                    Plot_no++;
                    strcpy(Filename,Filename_base);
                    strcat(Filename,Filename_suffix);
                            PolPlotf.Plotinit(8.,11.,Filename);
                            PolPlotf.Line(1,4.);
                            PolPlotf.Polax(Polar_Max_Radius-40.,Polar_Max_Radius,10.,10.);
                            double Dthet = Angle_Increment;
                            PolPlotf.Line(0,4.);
                            PolPlotf.Plotpol((float *)AOutPtr, Beams, Dthet, 40.-Polar_Max_Radius);
                            PolPlotf.Plotclose();
            };
    };
};
//      Deallocate Arrays:

delete TimeBasePtr;
        delete ScatBasePtr;
        delete IQrBasePtr;
        delete IQiBasePtr;
        delete CSMBasePtr;
        delete AvgCSMBasePtr;
        delete WrkCSMBasePtr;
        delete WhtNBasePtr;
        delete SteerBasePtr;
        delete OutputBasePtr;
        delete AOutputBasePtr;
        delete DBasePtr;
        delete Steer0BasePtr;
        return 0;

};      //      END OF MAIN PROGRAM
```

IQFOCUS.CPP

```cpp
//          IQFOCUS.CPP -- This contains functin IQMat called by ALMABEAM.CPP
//      Computes Element IQ components for set of Freqs and Beams centered on Thetas
#include <complex.h>
#include <math.h>
#include <stdlib.h>
#include <matrix.h>
#include <sonarobj.h>
#include "almainpt.h"

const Elements = ELEMENTS;

int IQMat(double Thetas, double Phis, float huge (*IQrBasePtr)[Elements],
        float huge (*IQiBasePtr)[Elements], double (*SteerBasePtr)[Elements],double (*Steer0BasePtr)[Elements],
complex (*DBasePtr),
        T *TimeBasePtr, Target *ScatBasePtr, XYZPos Rec_array[], int Nfreqs,
        int Beams_in_covar, double Freq0, double Amod, double C0, int Scatterers,
        double F_res, int Freq_Offset, int Ranges, int NAngles, double R0, double Range_cell)
{

//      IF "FOCUS" IS EQUAL TO 1, THEN THE STEERING VECTORS ARE FOCUSED IN RANGE int focus = FOCUS;
        double Angle[300], Ang[300];
        int Itheta = Thetas/90; // Figure out Thetas quadrant
        static double Delta_f[Elements];
        double Freqcell, Arg;
        complex IQC;
        complex (* DPtr);
        int i,j,k,l;
        Target Source(0.,0.,0.,1.);
        T Field_Time;
        Target Field_Point (R0,Thetas,Phis,1.);
        Line Aline(Source,Field_Point);
        const double PI = 2.*asin(1.0);
        const double DtoR = PI/180.;
        float huge (*IQr1)[Elements];
        float huge (*IQi1)[Elements];
        float huge (*IQi)[Elements];
        float huge  (*IQr)[Elements];
        T *TimePtr; // Time array is vector of T
        Target (*ScatPtr);

double (* SteerVecPtr)[Elements];
        double (* Steer0VecPtr)[Elements];
        Thetas *= DtoR;
        Phis *= DtoR;
        void huge *IQrPtr = IQrBasePtr;
        void huge *IQiPtr = IQiBasePtr;

//      Initialize matrices to hold IQ results

Matinit((float huge *)IQrPtr,Nfreqs*Beams_in_covar,Elements, 0.);
        Matinit((float huge *)IQiPtr,Nfreqs*Beams_in_covar,Elements, 0.);

double Sign;

//      Start with Thetas and lay out all independent angles on equal sine spacings switch (Itheta){ case 0: {
                        Sign = 2.;
                        Angle[0] = Thetas;
                        for(l=1; l<NAngles; l++){
                                Arg = sin(Angle[l-1]) - Sign/NAngles;
                                if(Arg < -1.){
                                        Sign = -Sign;
                                        Arg = sin (Angle[0]) - Sign/NAngles;
                                }
                                if(Arg > 1.){
                                        cout << "Too Many Angles\n";
                                        exit(0);
                                };
                                Angle[l] = asin(Arg);
                        }
                        break;
                };
                case 1: {
                        Sign = 2.;
                        Angle[0] = Thetas;
                        for(l=1; l<NAngles; l++){
                                Arg = sin(Angle[l-1]) - Sign/NAngles;

if(Arg < -1.){
                                        Sign = -Sign;
```

```
                        Arg = sin (Angle[0]) - Sign/NAngles;
                    }
                    if(Arg > 1.){
                        cout << "Too Many Angles\n";
                        exit(0);
                    };
                    Angle[1] = PI - asin(Arg);
                };
                break;
            };
            case 2: {
                Sign = -2.;
                Angle[0] = Thetas;
                for(l=1; l<NAngles; l++){
                    Arg = sin(Angle[l-1]) - Sign/NAngles;

if(Arg > 1.){
                        Sign = -Sign;
                        Arg = sin (Angle[0]) - Sign/NAngles;
                    }
                    if(Arg < -1.){
                        cout << "Too Many Angles\n";
                        exit(0);
                    };
                    Angle[1] = PI - asin(Arg);
                };
                break;
            };
            default: {
                Sign = -2.;
                Angle[0] = Thetas;
                for(l=1; l<NAngles; l++){
                    Arg = sin(Angle[l-1]) - Sign/NAngles;

if(Arg > 1.){
                        Sign = -Sign;
                        Arg = sin (Angle[0]) - Sign/NAngles;
                    }
                    if(Arg < -1.){
                        cout << "Too Many Angles\n";
                        exit(0);
                    };
                    Angle[1] = 2.*PI + asin(Arg);
                };
                break;
            };
        };
//***********Sort angles by proximity to Thetas************* for(l=1;l<NAngles;l++){
            Ang[l]=Angle[l]-Thetas;
        };
        for(j=1;j<NAngles-2;j++){
            double Largest=0.;
            int Ilarge=0;
            for(l=1;l<NAngles;l++){
                if( fabs(Ang[l]) > fabs(Largest)) {
                    Largest = Ang[l];
                    Ilarge = l;
                };
            };
            Angle[NAngles - j] = Largest + Thetas;
            Ang[Ilarge] = 0.;
        };

double Delta_f0[Elements];

for (l=0; l<Beams_in_covar; l++){
            Thetas = Angle[l];
            PolarPos UnitSteer(1.,Thetas,Phis); // Unit vector in steering dir.
            for(k=0; k<Elements; k++){
                Delta_f[k] = (UnitSteer.X()*Rec_array[k].X
                    + UnitSteer.Y()*Rec_array[k].Y
                    + UnitSteer.Z()*Rec_array[k].Z)*2.*Freq0*Amod/C0;
                //      Freq offset for ea. elt. re steer dir.
                if(l==0) Delta_f0[k] = Delta_f[k];
            };
            // Define the elements of the steering vector
            // S for each frequency 0 to Nfreqs-1.
            double F_n, F_0, Ipart;
            SteerVecPtr = SteerBasePtr;
            Steer0VecPtr = Steer0BasePtr;
            switch (focus){
                case 0: {
                    for(i=0; i<Nfreqs; i++){
                        DPtr = DBasePtr + i*Beams_in_covar + l;
                        *DPtr = complex (0.,0.); // Initialize sum for D vector component
                        F_0 = (i-Freq_Offset)*F_res;
                        for(int j=0; j<Elements; j++){
                            F_n = F_0  - Delta_f[j];
                            Arg = 2.*PI*modf((F_n*(1. - 0.5*F_n/Freq0))/2./Amod,&Ipart);
                            (*SteerVecPtr)[j] =  Arg;
                            if (l==0) (*Steer0VecPtr)[j] = Arg; // Save Thetas value
```

```
//      Increment D with element response only if response is within same frequency cell if(fabs(Delta_f0[j] - Delta_f[j])/F_res < .5)
                                     *DPtr += exp(complex(0.,(*Steer0VecPtr)[j]-Arg));
                            );
                            SteerVecPtr++;
                            Steer0VecPtr++;
                    );
                    break;
                    );
                    case 1: { // this case calculates S and D based on response to unit target
                                  // at correct range and bearing
                            for(i=0; i<Nfreqs; i++){
                                    DPtr = DBasePtr + i*Beams_in_covar + 1;
                                    *DPtr = complex (0.,0.); // Initialize sum for D vector component
                                    F_0 = (i-Freq_Offset)*F_res;
                                    double R = R0 + F_0/F_res*Range_cell;
                                    Field_Point = Target (R,Thetas,Phis,1.);
                                    double T0=Aline.Distance(Source,Field_Point) - 2.*R0;
                                    for(int j=0; j<Elements; j++){
                                            Field_Time.Time=(T0+Aline.Distance(Rec_array[j],Field_Point))/C0;
                                            F_n = F_0  - Delta_f[j];
                                            Arg = Field_Time.Phase(Freq0,Amod);
                                            (*SteerVecPtr)[j] =  Arg;
                                            if (l==0) (*Steer0VecPtr)[j] = Arg;

//      Increment D with element response only if response is within same frequency cell if(fabs(Delta_f0[j] - Delta_f[j])/F_res < .5)
                                     *DPtr += exp(complex(0.,(*Steer0VecPtr)[j]-Arg));
                            );
                            SteerVecPtr++;
                            Steer0VecPtr++;
                    );
                    break;
                    );
            );
            int Findex;
            TimePtr = TimeBasePtr;

//      Gather up Scatterers for each Frequency Cell for (i=0;i<Ranges;i++){     // TimePtr starts pointing to beg of array.
                    for (j=0;j<Scatterers;j++){
                            ScatPtr = ScatBasePtr + i*Scatterers + j;
                            for (k=0;k<Elements;k++){
                                    Freqcell = ((TimePtr->Freq(Freq0,Amod) + Delta_f[k] ) /F_res + .5) + Freq_Offset;
                                    if((Freqcell >=0.) && (Freqcell <Nfreqs)){
                                            Findex = Freqcell;
                                            SteerVecPtr = SteerBasePtr + Findex;
                                            IQr = IQrBasePtr + Findex*Beams_in_covar + 1;
                                            IQi = IQiBasePtr + Findex*Beams_in_covar + 1;
                                            double Arg = TimePtr->Phase(Freq0,Amod)-(*SteerVecPtr)[k];
                                            double Root = sqrt(ScatPtr->Strength);
                                            IQC = exp(complex(0.,Arg));
                                            (*IQr)[k] += real(IQC)*Root;
                                            (*IQi)[k] += imag(IQC)*Root;
                                    )
                                    TimePtr++;     // Move to next element in Time array.
                            );
                    );
            );
            return 0;
}
```

What is claimed is:

1. A signal processor for processing an echo received by an array of N receiving elements from a target at range R ensonified or irradiated by an LFM signal of bandwidth B transmitted at a time $t=0$ for a duration T comprising:

means for receiving each element's output $f_n(t)$ over the element's total receiving time and for selecting time-window element outputs $f'_n(t)$ which are discrete portions of $f_n(t)$, each time window extending from arbitrary initial time $T_0$ to final time $T_f$, where for each window, $T_0$ and $T_f$ are the same for all $f'_n(t)$, $T_f$ is spaced from $T_0$ no more than T, and an observation time $T_n$ for any element is less than $T_f$-$T_0$ and is defined such that the arrival time of a target echo from range R, if the target is within the window, is given by $t=T_0+T_n$; and means operatively connected to the receiving and selecting means for multiplying the element outputs $f'_n(t)$ by a replica of the transmitted LFM signal and for filtering the result to remove unwanted sum-frequency terms for producing element frequency-difference outputs $g_n(t)$, the outputs $g_n(t)$ being frequencies which are directly proportional to the time $T_n$ of the target from the time $T_0$ so that the range $R=(c/2)(T_0+T_n)+\Delta R_n$, where c is the speed of sound, and $\Delta R_n$ is the distance by which R differs from each element's range to the target.

2. A processor as claimed in claim 1 including:

means operatively connected to the multiplying and filtering means for converting the element frequency-difference outputs to analytic signals in the Fourier transform frequency domain $Z_n(\omega_k)$ wherein $Z_n(\omega_k)$ contains a spectrum of frequency resolution cells $\omega_k$ for all values of k from 1 to K where K equals the number of time resolution cells in the currently processed window where each frequency resolution cell $\omega_k$ has a frequency width of $1/T$, and corresponds to a time-resolution cell of time width $1/B$, which corresponds to a range resolution cell of range width $c/2B$; and means operatively connected to the converting means for shifting the frequency difference element outputs $Z_n(\omega_k)$ in the frequency domain to produce element outputs $Z'_n(\omega_k)$ which are aligned to compensate for the range differences $\Delta R_n$ for each steering direction $\theta_v$ for all values of v from 1 to V, the frequency shifts being $$\Delta\omega_n = 2\pi \frac{B}{T} \frac{\Delta R_n}{c},$$

thereby making R the apparent range of the target at all of the elements.

3. A processor as claimed in claim 2 including:

means operatively connected to the shifting means for multiplying each output $Z'_n(\omega_k)$ by $\exp[-i\Phi_n(\omega_k)]$, where $\Phi_n(\omega_k)$ is the phase of a target signal in frequency resolution cell $\omega_k$ from direction $\theta_v$ for producing phase aligned sum-beam outputs $V_v(\omega_k,\theta_v)$ for each frequency-resolution cell $\omega_k$ for each steering direction $\theta_v$;

means operatively connected to the multiplying means for receiving the discrete beam outputs $V_v(\omega_k,\theta_v)$ for producing a cross-Spectral matrix B where $$B = V_v(\omega_k, \theta_v) V_q^*(\omega_k, \theta_q);$$

means operatively connected to the discrete beam output receiving means for receiving the matrix output B for producing a covariance estimate $$\overline{B} = \frac{1}{p} \sum_{i=k-\frac{p}{2}}^{i=k+\frac{p}{2}} B(\omega_i)$$

where $\overline{B}$ at a particular range is the average over p frequencies of the cross-spectral matrices of the discrete beam outputs $V_v(\omega_k, \theta_v)$ for all values of v from 1 to V, at frequency differences $\omega_i$, which correspond to sequential range resolution cells, said sequence of cells being centered on the cell corresponding to frequency $\omega_k$, the cell for which outputs are to be calculated in the k-th iteration of the beamforming process, where k takes all values from 1 to K, where K = the number of time resolution cells in the currently processed window;

means operatively connected to the matrix output receiving means for receiving the covariance estimate $\overline{B}$ and for producing adapted weight vectors $W_v$;

means operatively connected to the covariance estimate receiving means for applying adapted weight vectors $W_v$ for all values of v from 1 to V to the respective beam outputs $V_v(\omega_k)$ for all values of k from 1 to K and summing the weighted outputs to produce an optimized beam output $W_v^* V_v$.

4. A processor as claimed in claim 3 wherein: the LFM signal is a sonar signal.

5. A processor as claimed in claim 2 including:
means operatively connected to the shifting means for receiving the discrete element outputs $Z'_n(\omega_k)$ and for forming them into a cross-spectral matrix output R, wherein the element $R_{mn}$ equals $Z_m'(\omega_k) Z'_n{}^*(\omega_k)$;

means operatively connected to the discrete element output receiving means for receiving the matrix output R and for producing a covariance estimate $$\overline{R} = \frac{1}{p} \sum_{i=k-\frac{p}{2}}^{i=k+\frac{p}{2}} R(\omega_i),$$

where $\overline{R}$ at a particular range is the average over p frequencies of the cross spectral matrices of the discrete element outputs $Z_n'(\omega_k)$ for all values of n from 1 to N, at frequency differences $\omega_i$, which correspond to sequential range resolution cells, said sequence of cells being centered on the cell corresponding to frequency $\omega_k$, the cell for which outputs are to be calculated in the k-th iteration of the beamforming process, where k takes all values from 1 to K, where K = the number of time resolution cells in the currently processed window;

means operatively connected to the matrix output receiving means for receiving the covariance estimate $\overline{R}$ and for producing adapted weight vectors $W_v$ and the conjugate thereof which is $W_v^*$;

means operatively connected to the covariance estimate receiving means for applying adapted weight vectors $W_v$ for all values v from 1 to V to the respective element output vectors $Z'(\omega_k)$ for all values of k from 1 to K and summing the weighted outputs to produce an optimized beam output $W_v^* Z'_v$.

6. A processor as claimed in claim 5 wherein: the LFM signal is a sonar signal.

7. A method for processing an echo received by an array of N receiving elements from a target at range R ensonified or irradiated by an LFM signal of bandwidth B transmitted at a time $t=0$ for a duration T comprising the steps of:

receiving each element's output $f_n(t)$ over the element's total receiving time and selecting therefrom time-window element outputs $f'_n(t)$ which are discrete portions of $f_n(t)$, each time window extending from arbitrary initial time $T_0$ to final time $T_f$, where for each window, $T_0$ and $T_f$ are the same for all $f'_n(t)$, $T_f$ is spaced from $T_0$ no more than T, and a target observation time $T_n$ for any element is less than $T_f - T_0$ and is defined such that the arrival time of an echo from range R, if the target is within the window, is given by $t = T_0 + T_n$;

multiplying the element outputs $f'_n(t)$ by a replica of the transmitted LFM signal and filtering the result to remove unwanted sum-frequency terms for producing element frequency-difference outputs $g_n(t)$, the outputs $g_n(t)$ being frequencies which are directly proportional to the time $T_n$ of the target from the time $T_0$ so that the range $R = (c/2)(T_0 + T_n) + \Delta R_n$, where c is the speed of sound, and $\Delta R_n$ is the distance by which $R_n$ differs from each element's range to the target.

8. A method as claimed in claim 7 including the steps of:

converting the element frequency-difference outputs to analytic signals in the Fourier transform frequency domain $Z_n(\omega_k)$ wherein $Z_n(\omega_k)$ contains a spectrum of frequency resolution cells $\omega_k$ for all values of k from 1 to K where K equals the number of time resolution cells in the currently processed window where each frequency resolution cell $\omega_k$ has a frequency width of 1/T, and corresponds to a time resolution cell of time width 1/B, which corresponds to a range resolution cell of range width c/2B; and shifting the frequency difference element outputs $Z_n(\omega_k)$ in the frequency domain to produce element outputs $Z'_n(\omega_k)$ which are aligned to compensate for the range differences $\Delta R_n$ for each steering direction $\theta_v$ for all values of v from 1 to V, the frequency shifts being $$\Delta\omega_n = 2\pi \frac{B}{T} \frac{\Delta R_n}{c},$$

thereby making R the apparent range of the target at all of the elements.

* * * * *